US006108883A

United States Patent [19]

Cotter

[11] Patent Number: 6,108,883

[45] Date of Patent: Aug. 29, 2000

[54] RETAINING RING REMOVAL TOOL

[75] Inventor: Jonathan P. Cotter, Dearborn, Mich.

[73] Assignee: Diebolt International, Inc., Plymouth, Mich.

[21] Appl. No.: 09/353,564

[22] Filed: Jul. 14, 1999

Related U.S. Application Data

[62] Division of application No. 08/922,850, Sep. 3, 1997, Pat. No. 5,974,646.

[51] Int. Cl.$^7$ ..................... B23P 19/00

[52] U.S. Cl. ..................... 29/229; 29/229; 29/269; 29/267; 29/278; 29/426.5

[58] Field of Search ..................... 29/214, 282, 426.1, 29/426.5, 426.6, 267, 235, 268, 269, 229

[56] References Cited

U.S. PATENT DOCUMENTS

| | | | |
|---|---|---|---|
| 346,608 | 8/1886 | Ring . | |
| 530,361 | 12/1894 | Smith et al. . | |
| 1,151,712 | 8/1915 | Phillips . | |
| 1,316,409 | 9/1919 | Bahre . | |
| 2,154,580 | 4/1939 | Perrin | 81/5.1 |
| 2,508,555 | 5/1950 | Whitney | 29/229 |
| 2,583,876 | 1/1952 | Penkauskas | 29/268 |
| 2,710,520 | 6/1955 | Selzer | 29/267 |
| 2,995,340 | 7/1961 | Richardson | 29/267 |
| 3,577,848 | 5/1971 | Mengle | 29/426.1 |
| 3,973,318 | 8/1976 | Strachan | 29/278 |
| 4,074,411 | 2/1978 | Willard . | |
| 4,649,618 | 3/1987 | Harrison | 29/426.5 |
| 4,813,120 | 3/1989 | Fournier | 29/426.6 |
| 5,943,754 | 8/1999 | Plite | 29/229 |

*Primary Examiner*—David P. Bryant
*Assistant Examiner*—Steven A. Blount
*Attorney, Agent, or Firm*—Reising, Ethington, Barnes, Kisselle, Learman & McCulloch, P.C.

[57] ABSTRACT

A tool to remove a retaining ring at least partially received in a groove of a cylinder has a handle lever constructed to engage the open end of the cylinder and a claw lever having a hooked end or claw constructed to be received at least partially underneath the retaining ring with the claw lever pivotally connected to the handle lever permitting relative movement between the two levers. The pivotal connection between the handle lever and claw lever permits them to be separated and joined together in a scissor-like fashion to facilitate engaging the claw with the retaining ring. When engaged with the retaining ring, the tool is pivoted about the cylinder to displace the claw and thereby displace the retaining ring inwardly and upwardly of the groove to remove it from the cylinder. The tool permits easy and non-destructive removal of the retaining ring and requires relatively low force and a relatively low level of skill to remove the retaining ring from the cylinder.

11 Claims, 2 Drawing Sheets

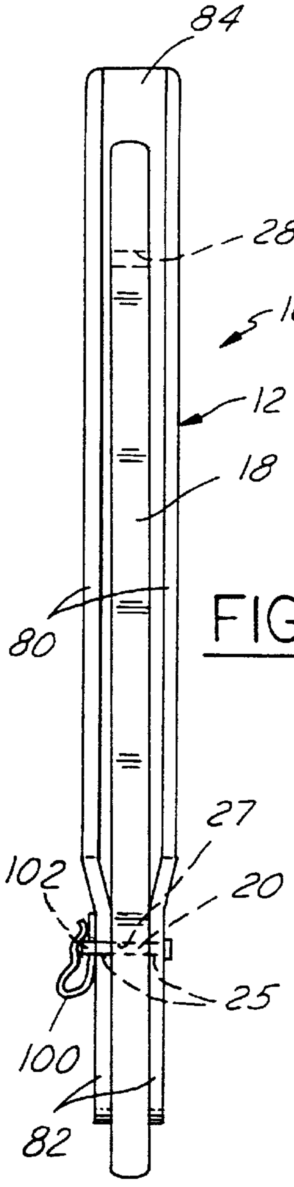
FIG. 4
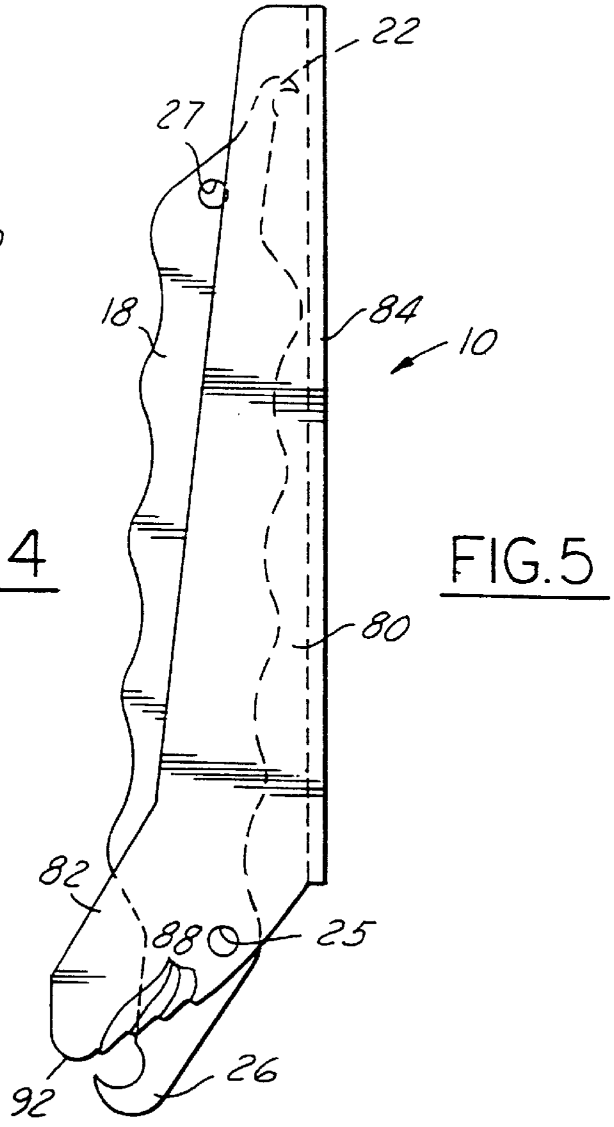
FIG. 5
FIG. 6
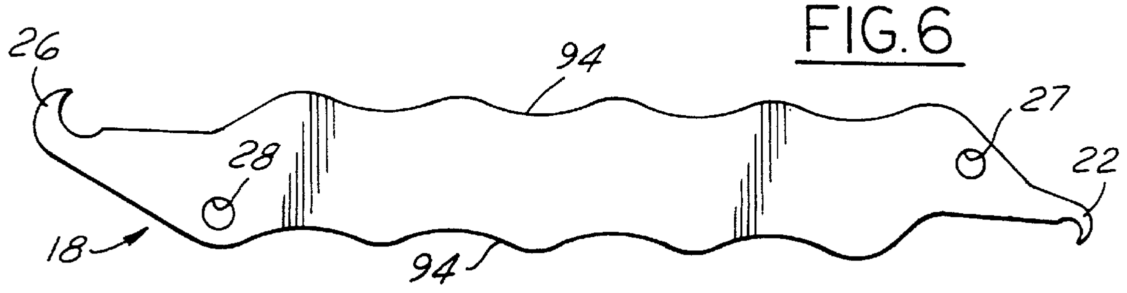
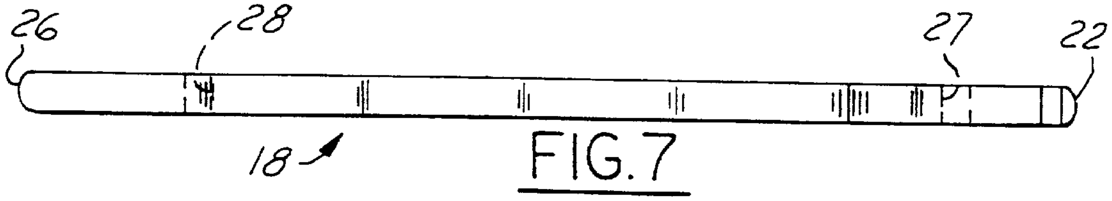
FIG. 7

RETAINING RING REMOVAL TOOL

REFERENCE TO CO-PENDING APPLICATION

This application is a division of co-pending application, Ser. No. 08/922,850, filed Sep. 3,1997, now U.S. Pat. No. 5,974,646.

FIELD OF THE INVENTION

This invention relates to fluid cylinders such as gas springs, accumulators and hydraulic cylinders and more particularly to an apparatus to remove a retaining ring from a cylinder.

BACKGROUND OF THE INVENTION

Typically, gas springs, accumulators, and pneumatic and hydraulic cylinders utilize a round spring steel wire retaining ring to retain a seal and bearing assembly which provides a seal and bearing surface adjacent the piston or piston rod and also retains the piston or piston rod within the cylinder. The retaining ring is usually received in a radius groove machined near the open end and in the interior surface of the cylinder. The retaining ring bears on a shoulder provided by the groove and the seal and bearing housing bears on the opposite face of the retaining ring to retain the seal and bearing assembly within the cylinder.

When it is required to repair the fluid cylinder such as to replace the seal or bearing, it is necessary to remove the retaining ring from the groove within the cylinder. Usually, this requires special machining on the cylinder to allow access to the outside of the retaining ring whereby it may be pried free or popped out of the groove. Alternatively, the retaining ring may be modified such as by drilling holes through the ring or by notching or flattening a portion of the ring to enable a tool to compress the ring and remove it from the cylinder. Modifying the retaining ring involves costly manufacturing processes and requires a relatively high degree of skill for the operator to remove the ring and is thus labor intensive and costly.

SUMMARY OF THE INVENTION

A tool to remove a retaining ring at least partially received in a groove of a cylinder has a handle lever constructed to engage the open end of the cylinder and a claw lever having a hooked end or claw constructed to be received at least partially underneath the retaining ring with the claw lever pivotally connected to the handle lever permitting relative movement between the two levers. The pivotal connection between the handle lever and claw lever permits them to be separated and joined together in a scissor-like fashion to facilitate engaging the claw with the retaining ring. When engaged with the retaining ring, the tool is pivoted about the cylinder to displace the claw and thereby displace the retaining ring inwardly and upwardly of the groove to remove it from the cylinder. The tool permits safe and easy removal of the retaining ring and requires relatively low force and a relatively low level of skill to remove the retaining ring from the cylinder.

The handle lever preferably has a base portion with a stepped face providing several stops or shoulders each constructed to engage the open end of the cylinder to anchor the handle on the cylinder to facilitate the application of force to the tool. The shoulders of the stepped face each provide a different mechanical advantage and permit a varying relative angle between the tool and the cylinder to permit a varied path of movement of the claw relative to the retaining ring and thereby facilitate removal of the retaining ring from the cylinder. The interior surface of the claw preferably has a radius similar or complementary to the radius of the retaining ring to enable the claw to firmly engage the retaining ring. Preferably, to permit the tool to be used with a variety of sizes of retaining rings, the claw lever has a claw at each end with both claws of a different size and the claw lever can be pivotally connected to the handle lever such that each claw can be used to remove a retaining ring.

Objects, features and advantages of this invention include providing an improved tool to facilitate removal of a retaining ring from a groove within a cylinder which is formed from low cost materials, requires a relatively low level of skill to operate, generally requires a force of less than 20 pounds to remove various sizes of retaining rings, provides increased safety to the user, can be used to remove a wide range of sizes of retaining rings, does not require special machining on the cylinder or the retaining ring to remove the retaining ring, is compact, of relatively simple design and economical manufacture, and has a long and useful life in service.

BRIEF DESCRIPTION OF THE DRAWINGS

These and other objects, features and advantages of this invention will be apparent from the following detailed description of the preferred embodiments and best mode, appended claims and accompanying drawings in which:

FIG. 4 is a plan view of the retaining ring removal tool, FIG. 5 is a side view of the retaining ring removal tool;

FIG. 6 is a side view of the claw lever which is part of the retaining ring removal tool; and FIG. 7 is a plan view of the claw lever.

DETAILED DESCRIPTION OF THE PREFERRED EMBODIMENTS

Figure 1:
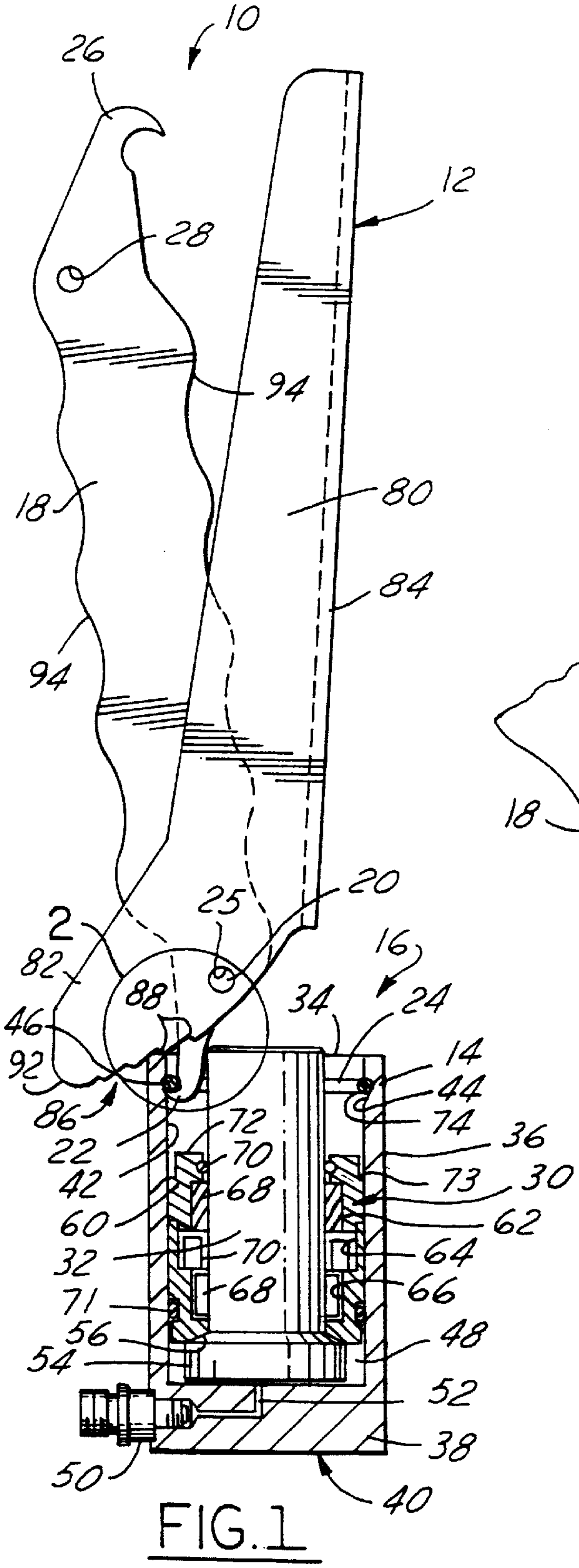
FIG. 1 is a sectional view of a gas spring illustrating a retaining ring removal tool embodying the invention initially engaged with the retaining ring of the gas spring.

Referring in more detail to the drawings, FIG. 1 illustrates a retaining ring removal tool 10 embodying this invention and having a handle lever 12 which bears on a cylinder 14 of a gas spring 16 to provide leverage during use of the tool 10 and a claw lever 18 pivotally connected to the handle lever 12 by a hinge pin 20 and having at least one hook shaped end or claw 22 constructed to engage underneath a retaining ring 24 in the cylinder 14 and when the tool is rotated to remove the retaining ring 24 from the cylinder 14. The hinge pin 20 is shown removably retained in aligned openings 25, 27 (FIG. 4) adjacent one end of the levers by an enlarged head on one end of the pin and a cotter pin extending through an opening adjacent the opposite end thereof Preferably, the claw lever 18 has a claw 22 at one end and a claw 26 of a different size at the opposite end so that the tool 10 may be used to remove retaining rings 24 of various sizes. To use the claw 26 to remove a retaining ring, the pin 20 is removed, the claw lever is reversed end-for-end, and the pin 20 inserted in the same openings 25 in the handle lever and an aligned opening 28 adjacent the opposite end of the claw lever.

The gas spring 16 has a sealing and bearing assembly 30 received within the cylinder 14 of the gas spring 16 and a piston rod 32 slidably received in the sealing and bearing assembly 30 for axial reciprocation. The cylinder 14 has an open end 34 with a circumferentially continuous sidewall 36 and a base 38 preferably integrally formed with the sidewall 36 and closing one end 40 of the cylinder 14. The interior wall 42 of the cylinder 14 has an annular groove 44 formed to provide a shoulder or stop surface 46 which is engaged by the retaining ring 24 received in the groove 44. The retaining ring 24 may be either annular or C-shaped. To admit gas into a gas chamber 48 defined by the cylinder 14, the piston rod 32 and the sealing and bearing assembly 30, a filler valve 50 is threadably received within the base 38 in communication with a fill passage 52 through which gas flows into the gas chamber 48.

The piston rod 32 is an elongated cylindrical member having an enlarged end portion or piston 54 preferably integrally formed with the piston rod 32 and received within the gas chamber 48. The enlarged diameter piston 54 provides a shoulder 56 which bears on the sealing and bearing assembly 30 when the piston rod 32 is at its fully extended position to retain the piston rod 32 within the cylinder 14.

The sealing and bearing assembly 30 has an annular retaining member 60 slidably received in the cylinder 14 and having several annular grooves 62, 64, 66 formed in its interior surface. Bearing rings 68 are received in grooves 62 and 66 and a sealing member 70 is received in groove 64. The bearing rings 68 guide the piston rod 32 for axial reciprocation and the sealing member 70 provides a gas tight seal between the piston rod 32 and the retaining member 60. An O-ring seal 71 received in an annular groove provides a gas tight seal between the retainer 60 and the interior wall 42 of the cylinder 14 to prevent gas from leaking out of the gas chamber 48. To releasably retain the retaining member 60 within the cylinder 14 the retaining member 60 has an upstream end 72 with an annular shoulder 73 constructed to engage the lower surface 74 of the retaining ring 24 which itself is engaged with the stop surface 46 formed by the groove 44.

Figure 2:
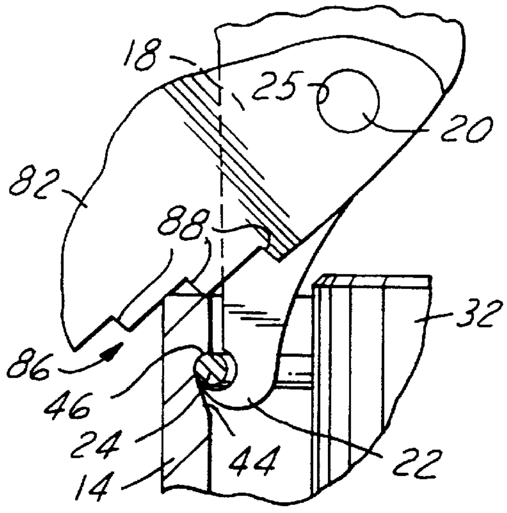
FIG. 2 is an enlarged view of the encircled portion 2 of FIG. 1.
Figure 3:
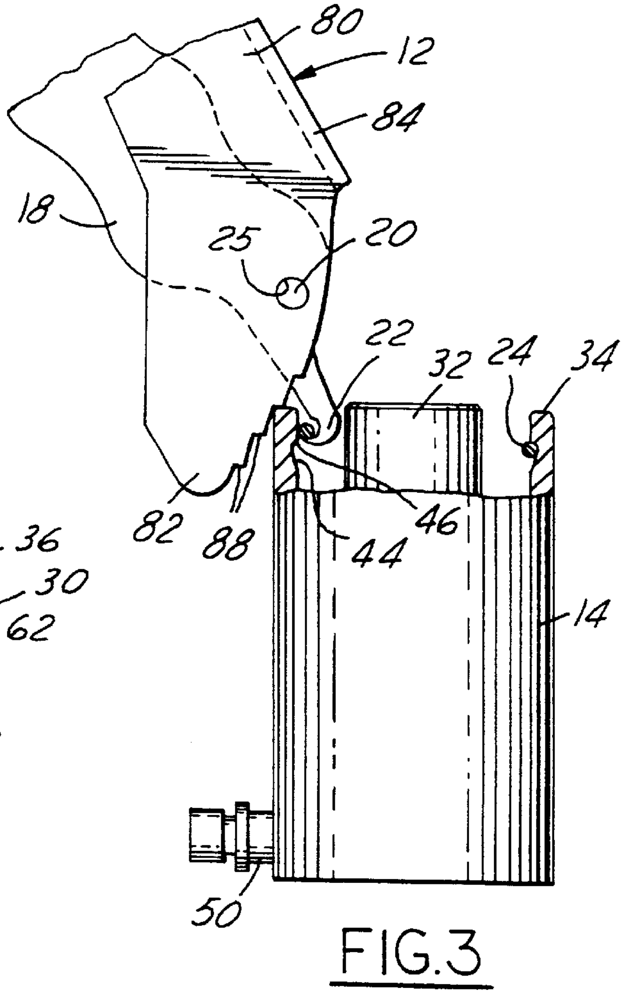
FIG. 3 is an elevational view with parts broken away and in section illustrating the tool manipulated as it removes the retaining ring from the cylinder.

As shown in FIG. 4 to provide a more stable interface between the handle lever 12 and the cylinder 14, preferably the handle lever 12 is generally channel-shaped, having a pair of spaced apart parallel sidewall portions 80 and an interconnecting back wall 84. The sidewall portions 80 have extensions 82 at one end which project beyond the end of the back wall 84. The handle lever 12 is preferably formed from a single piece of sheet steel which is laserbeam cut or stamped and then formed into the final shape. The extensions 82 of the handle levers 12, which engage the cylinder 14, preferably have a stepped surface 86 providing a number of notches 88 engageable with the open end 34 of the cylinder 14 to prevent slippage between the tool 10 and the cylinder 14 and also to provide a varying mechanical advantage of the tool 10 as each notch 88 is at an increasing distance from the hinge pin 20. The extensions 82 are preferably disposed at an obtuse included angle relative to the back wall 84 with the holes 25 for the hinge pin 20 formed in the extensions 82 spaced from the free end 92 of the extensions 82. In use, as shown in FIGS. 1–3, this positions the claw 22 pivoted on the hinge pin 20, generally adjacent the piston rod 32 so that the claw 22 can be extended into the cylinder 14 between the piston rod 32 and the interior wall 42 to engage the retaining ring 24.

As best shown in FIGS. 1 and FIGS. 5–7, the claw lever 18 is a thin, elongate member received between the sidewall portions 80 and preferably has sinuous edges 94 to more comfortably receive the fingers of the operator of the tool 10 thereon. The claw lever 18 is preferably formed from a high carbon heat treatable steel and is laser-beam cut or machined and may thus be manufactured at a relatively low cost even in low volume. At one end the claw lever 18 has a relatively large claw 26 and at its opposite end the claw lever 18 has a relatively small claw 22 to enable use of the tool 10 with various sizes of retaining rings 24. The openings 27, 28 in the claw lever 18 are preferably formed adjacent opposite ends thereof so that the claw lever 18 may be turned end-for-end and either claw 22 or claw 26 used to engage the retaining ring 24. To change the orientation of the claw lever 18 from its orientation in FIG. 1 to its orientation in FIG. 5, the cotter pin 100 is removed from a transverse hole 102 through the hinge pin 20, the hinge pin 20 is removed, the claw lever 18 is rotated 180° so that the opening 28 adjacent the new end is aligned with the openings 25 through the handle lever 12 and then the hinge pin 20 is reinserted through the handle levers 12 and the claw lever 18 and the cotter pin 100 is reinserted onto the hinge pin 20 to hold the pin 20 in place. The hinge pin 20 loosely connects the handle lever 12 and the claw lever 18 so that they may be individually pivoted about the hinge pin 20.

Operation

To remove a retaining ring from 24 a gas spring 16, the compressed gas (typically at 2,000 psi) is first relieved and removed from the gas chamber 48 through the passage 52 and then the bearing and sealing assembly 30 and the piston rod 32 slide to the bottom of the cylinder 14 away from the retaining ring 24. A claw 22 or 26 is inserted into the open end 34 of the cylinder 14 and the extensions 82 of the handle lever 12 are situated on the open end 34 of the cylinder 14 with an appropriate notch 88 engaging the cylinder 14 which permits the claw 22 or 26 to be disposed in the cylinder 14 beneath the retaining ring 24. The operator of the tool 10 then squeezes the free end of the claw lever 18 towards the back wall 84 of the handle lever 12, rotating the claw lever 18 clockwise about the hinge pin 20 as viewed in FIG. 1. This moves the claw 22 into engagement with the lower surface 74 of the retaining ring 24 such that the claw 22 is firmly seated on the retaining ring 24 and received at least partially between the retaining ring 24 and the groove 44.

As shown in FIG. 3, the operator then pushes the handle lever 12 away from the center of the cylinder 14 (counterclockwise in FIGS. 1–3) such that the handle lever 12 pivots about the open end 34 of the cylinder 14. As the tool 10 pivots in this direction about the cylinder 14, the claw 22 is displaced upwardly and inwardly of the cylinder 14 to compress the retaining ring 24 and lift it out of the groove 44. If continued movement of the handle lever 12 away from the center of the cylinder 14 (counterclockwise as viewed in FIGS. 1–3) does not completely release the retaining ring 24 from the groove 44, the handle lever 12 may be adjusted so that a notch 88 further from the hinge pin 20 is engaged with the end 34 of the cylinder 14 thereby raising the entire tool 10, including the claw lever 18 and the claw 22 engaged with the retaining ring 24, further from the cylinder 14 to remove the retaining ring 24 when the handle lever is again pivoted on the open end 34 of the cylinder 14 away from its centerline (counterclockwise in FIGS. 1–3).

The increased mechanical advantage provided by the tool 10 enables quick and easy removal of various sizes of retaining rings 24 from a cylinder 14 without the need for special machining of the cylinder 14 or retaining ring 24. The tool 10 may be manufactured at low cost even in small production runs and provides a long, useful life in service.

what is claimed is:

1. A tool for removing a retaining ring at least partially received in a groove in an interior wall of a cylinder adjacent an open end of the cylinder comprising:

a longitudinally elongated handle lever having a pair of spaced apart end portions, one end portion having a notch constructed to engage an open end of the cylinder, a longitudinally elongated claw lever having a pair of spaced apart end portions, one end portion having a hook with a generally C-shaped-portion opening toward the notch in the handle lever and constructed to underlie and engage a portion of a retaining ring in a groove opening into an interior wall of the cylinder, a pivot connecting said levers adjacent the notch and hook thereof, said pivot being located longitudinally between the pair of end portions of each lever, adjacent to and spaced generally longitudinally from the one end portion of each lever and generally laterally spaced from both the notch and the hook with both the notch and the hook on the same lateral side of the pivot when they are simultaneously engaged with the end of the cylinder and the retaining ring respectively for removing the retaining ring, each lever having a manually engageable portion disposed longitudinally between the pivot and the other end of its associated lever, the manually engageable portions extending generally longitudinally and being laterally spaced apart and generally opposed and constructed to be simultaneously manually engageable by the same hand to move the manually engageable portions of the levers about the pivot generally toward each other to simultaneously engage the notch with the end of the cylinder and the hook in underlying engagement with the retaining ring with the adjacent end of the cylinder wall between the one ends of the levers whereby, when the notch of the handle lever is engaged with the end of the cylinder and the hook underlies and is engaged with the retaining ring and the tool is pivoted about the engagement of the notch with the end of the cylinder, the retaining ring is displaced radially inwardly and removed from the groove and toward the open end of the cylinder.

2. The tool of claim 1 wherein the one end portion of the handle lever is disposed at an obtuse included angle relative to the longitude of the handle lever and the notch is generally laterally spaced from the C-shaped hook on the claw lever.

3. The tool of claim 1 wherein the end portion of said handle lever has at least one additional notch, each of said notches being spaced a different distance from the pivot and engageable with the end of the cylinder to prevent the tool from slidably moving relative to the cylinder.

4. The tool of claim 1 wherein the C-shaped hook of the claw lever extends beyond the one end portion of the handle lever.

5. The tool of claim 1 wherein the handle lever is generally channel-shaped in cross section and has laterally spaced side walls and at least one pair of laterally spaced apart notches one in each of the side walls and the claw lever is disposed between said side walls.

6. The tool of claim 1 wherein the claw lever has a second hook formed on the other end portion of the claw lever and opening onto a side opposite to the side of the claw lever onto which the other hook opens so that the claw lever can be reversed end-for-end to change which hook engages the retaining ring, said pivot being adapted to pivotally connect the claw lever to the handle lever adjacent the other end portion of the claw lever when the claw lever is reversed.

7. The tool of claim 6 wherein the second hook has a C-shaped portion and the C-shaped portion of each hook is of a different size.

8. The tool of claim 1 wherein the one end portion of the handle lever is disposed at an obtuse included angle relative to the longitude of the handle portion and a plurality of notches are disposed along this one edge portion and each constructed to engage one at a time the end of the cylinder.

9. The tool of claim 1 wherein the handle lever is generally channel-shaped in cross section with laterally spaced apart side walls, each having an end portion with a notch constructed to engage the end of the cylinder and the claw lever is disposed between said side walls at least adjacent the one end portion thereof with the generally C-shaped portion of the hook disposed longitudinally outwardly beyond the end portion.

10. The tool of claim 9 wherein the claw lever has a second hook formed on the other end of the claw lever whereby the claw lever can be reversed end-for-end to change which hook engages the retaining ring and said pivot releasably connects the claw lever to the handle lever adjacent the other end portion of the claw lever when the claw lever is reversed.

11. The tool of claim 10 wherein each of the one end portions of the handle lever is disposed at an obtuse included angle relative to the longitude of the handle lever and a plurality of notches are disposed along each of the one end portions and each constructed to engage one at a time the end of the cylinder.

* * * * *